United States Patent [19]

Cone et al.

[11] 4,440,364

[45] Apr. 3, 1984

[54] RETRACTABLE AIRCRAFT STEP

[76] Inventors: Steven S. Cone, 13611 Heartside Pl., Dallas, Tex. 75234; David E. Jones, 747 Vinecrest, Richardson, Tex. 75080; Richard C. Serkland, Rte. 5, Box 93, McKinney, Tex. 75069

[21] Appl. No.: 300,259

[22] Filed: Sep. 8, 1981

[51] Int. Cl.³ .............................................. B64C 1/24
[52] U.S. Cl. ................................. 244/129.6; 16/282; 16/370; 244/129.4
[58] Field of Search ............... 244/129.6, 118.3, 129.5, 244/117 R, 119, 129.4; 280/166; 105/447, 448, 427, 432–434, 436, 450; 104/122; 16/280, 282, 291, 288, 293, 365, 302, 370

[56] References Cited

U.S. PATENT DOCUMENTS

| | | | |
|---|---|---|---|
| 1,176,348 | 3/1916 | Culver . | |
| 1,866,299 | 7/1932 | Ericson | 244/129.4 |
| 2,056,226 | 3/1936 | Mussey et al. | 105/437 |
| 2,146,668 | 2/1939 | Baade | 105/447 |
| 2,417,987 | 3/1947 | McFarland | 224/129 |
| 2,647,677 | 8/1953 | Reed | 244/129.6 |
| 2,951,454 | 9/1960 | Candlin, Jr. | 105/447 |
| 3,363,281 | 1/1968 | Borsani | 16/288 |
| 3,572,754 | 3/1971 | Fowler | 280/166 |
| 4,110,673 | 8/1978 | Nagy et al. | 105/447 |

*Primary Examiner*—Trygve M. Blix
*Assistant Examiner*—Ivy M. Shum
*Attorney, Agent, or Firm*—Hubbard, Thurman, Turner & Tucker

[57] ABSTRACT

A retractable aircraft step module comprises a streamlined fairing having a recess for receiving a retractable step member which is connected to the fairing by spaced apart pivot links which together with the step member and the body member form a four bar linkage. The linkage includes a deflectable pivot connection between one of the links and the step member which provides a biasing force to maintain the step member in the retracted position. The deflectable pivot connection is provided by a pivot beam mounted on the step member and including a counterdeflection adjustment for preselecting the maximum biasing force. The step member and the fairing are adapted to mount on the exterior of an aircraft fuselage and are preferably constructed of reinforced plastic.

18 Claims, 8 Drawing Figures

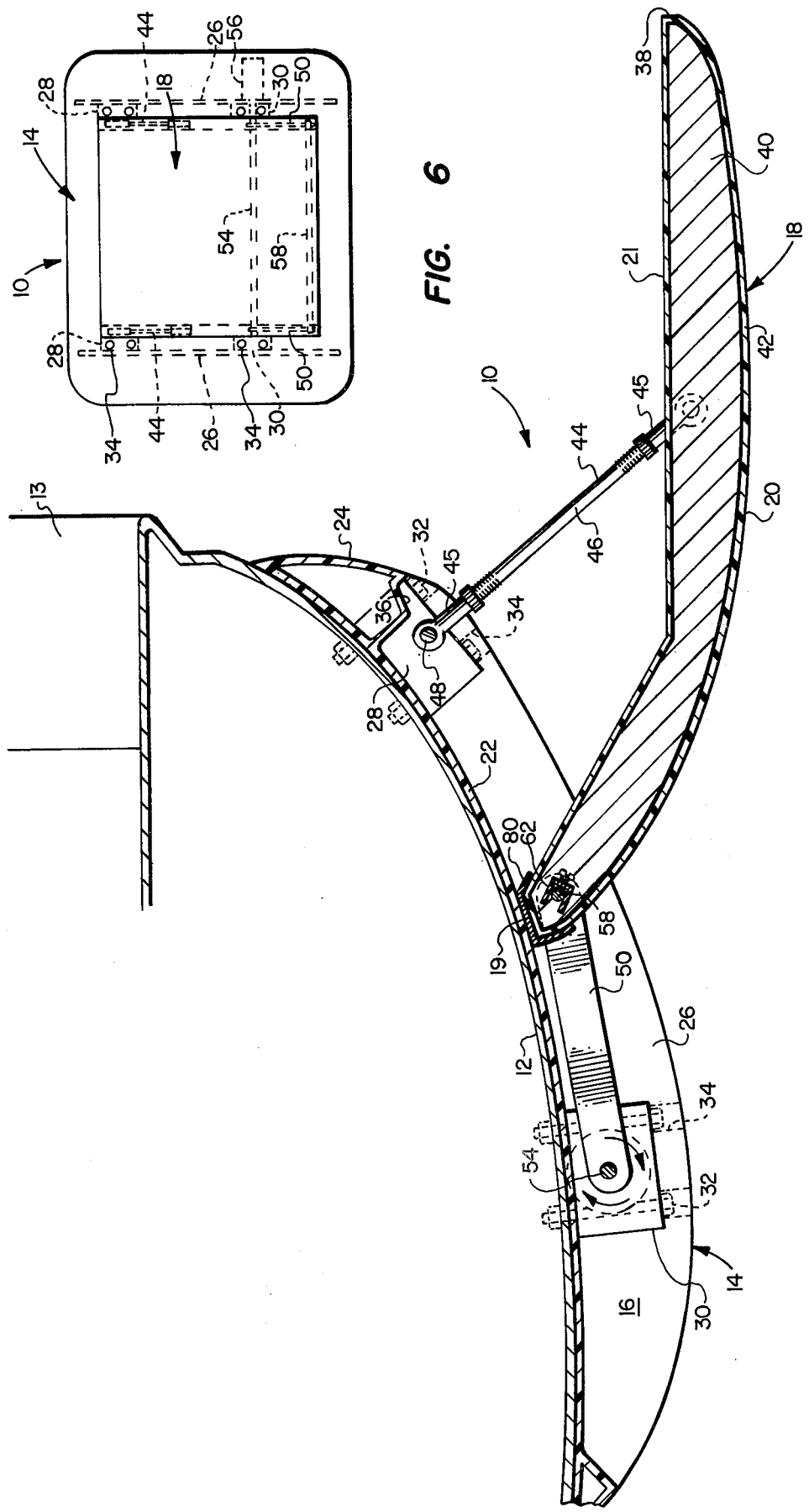

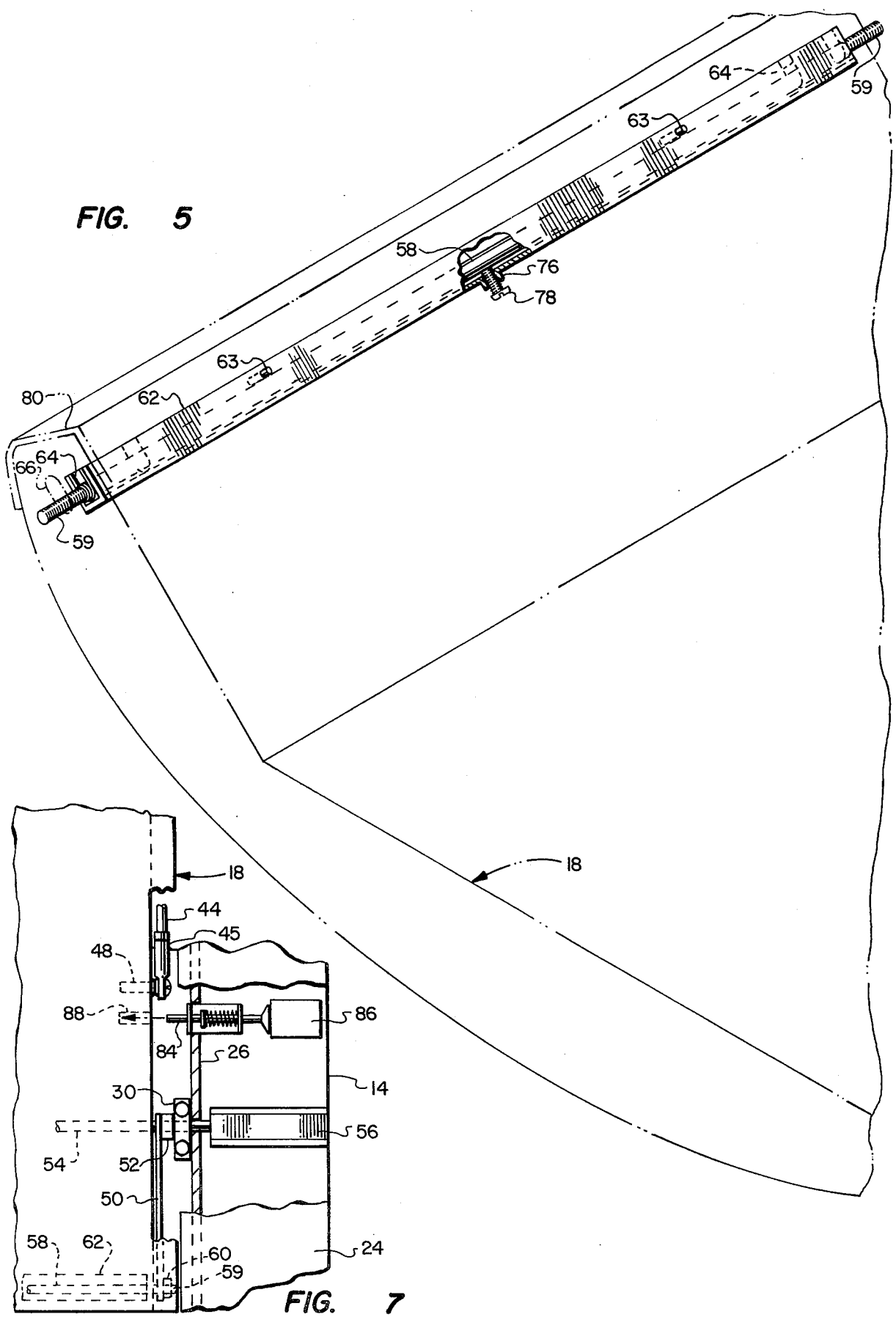

RETRACTABLE AIRCRAFT STEP

BACKGROUND OF THE INVENTION

1. Field of the Invention

The present invention pertains to an aircraft step module adapted for attachment to the exterior of an aircraft fuselage and including a retractable step member mounted on a linkage which provides for biasing the step in the retracted position.

2. Background Art

The design of many types of aircraft fuselages and cabin structures is such that there is no provision for passenger or cargo loading steps or surfaces extending from the cabin doorway. This is necessary because of the space requirements of structural components of the fuselage. Moreover, there are increasing numbers of auxiliary loading and unloading structures provided at many airports and related facilities. However, it is often desirable to provide for the addition of aircraft loading and unloading steps or platforms which make boarding and exiting the aircraft easier and safer due to the height of the cabin floor from the ground surface when the aircraft is parked away from ground based boarding facilities.

It is also often desirable to be able to retrofit access steps to aircraft which are designed for utility purposes but which often are converted for primarily passenger service. For example, a number of state of the art helicopter designs are intended primarily for utility purposes. Their fuselage structures are not designed primarily for passenger carrying and accordingly, no provisions are made at the loading doors for boarding steps or the like. However, the increased use of helicopters for business and personal travel has resulted in the adaptation of a number of helicopter designs for passenger service. In this respect it has become desirable to provide auxiliary devices such as boarding steps or the like to permit easy boarding and unloading of passengers.

In this regard, it has become particularly desirable to provide a modular unit which may be added to the exterior of the aircraft fuselage and thereby not requiring major structural modifications which are expensive and, of course, cannot compromise the integrity of the fuselage structure. However, the addition of appendages to the exterior of an aircraft structure must be done in such a way as to be compact and lightweight as possible and be configured to minimize aerodynamic drag. At the same time, however, structures which are adapted to support the weight of persons boarding or disembarking from the aircraft must possess adequate strength to support the loads incurred by such use. It is also important that structures which are deployed from a retracted position forming a streamlined body to a working position, be provided with means to minimize the chance of accidental deployment to the working position while the aircraft is in flight. Such action can, of course, seriously affect the handling characteristics of aircraft due to unbalanced aerodynamic forces.

All of the abovementioned desiderata and requirements for aircraft structures are difficult to meet in a structure which is economical to manufacture. However, in accordance with the present invention, substantially all of the objectives discussed hereinabove have been met in an improved modular aircraft step device which is retractable from a working or deployed position to a position which minimizes the effect of aerodynamic forces on the aircraft.

SUMMARY OF THE INVENTION

The present invention provides improved structure comprising a retractable step module which is adapted to be mounted on the exterior of an aircraft fuselage and is provided with a streamlined body member which minimizes aerodynamic drag forces exerted on the aircraft itself as a result of the presence of the module.

In accordance with one aspect of the present invention, there is provided a retractable step module adapted particularly to use as an add-on device which may be attached to the exterior of an aircraft fuselage without any appreciable modification to the structural components of the fuselage itself and without requiring any space within the envelope of the fuselage.

In accordance with another aspect of the present invention, there is provided a retractable step module for attachment to the exterior of an aircraft fuselage, in particular, a helicopter fuselage which is movable between an extended position for supporting passengers boarding and disembarking from the aircraft to a retracted position which provides a streamlined body having an exterior surface which is adapted to minimize aerodynamic drag forces exerted on the aircraft.

In accordance with yet another aspect of the present invention, there is provided a retractable aircraft step having a four bar supporting linkage arrangement which is operable to move the step between retracted and extended positions and wherein the linkage arrangement includes means for biasing the step into the retracted position to minimize accidental deployment from the retracted position.

The present invention still further provides a retractable aircraft step comprising a step member connected to a supporting linkage arrangement operable to move the step between retracted and deployed positions and wherein the step member itself, in the working position bears against the aircraft fuselage across a lateral edge of the step to provide a support surface capable of bearing the relatively heavy load imposed on the step while it is supporting persons boarding and disembarking from the aircraft. The particular linkage arrangement also provides for biasing the step member in a stable working position when a load is placed on the step tread portion.

The present invention still further provides a retractable aircraft step which is operated to move between retracted and deployed positions by a compact motor and drive linkage arrangement, said step unit including means for locking the step in the retracted and the deployed positions.

Those skilled in the art will recognize other superior features and advantages of the present invention upon reading the detailed description which follows in conjunction with the drawings.

BRIEF DESCRIPTION OF THE DRAWINGS

FIG. 2 is a section view taken substantially along the line 2—2 of FIG. 1;

FIG. 5 is a perspective view of the step member showing the details of the yieldable pivot beam for biasing the step member in the retracted position;

FIG. 6 is a plan view of the step module;

FIG. 7 is a detail plan view on a larger scale illustrating a portion of the step member and streamlined body member.

DESCRIPTION OF THE PREFERRED EMBODIMENT

Figure 1:
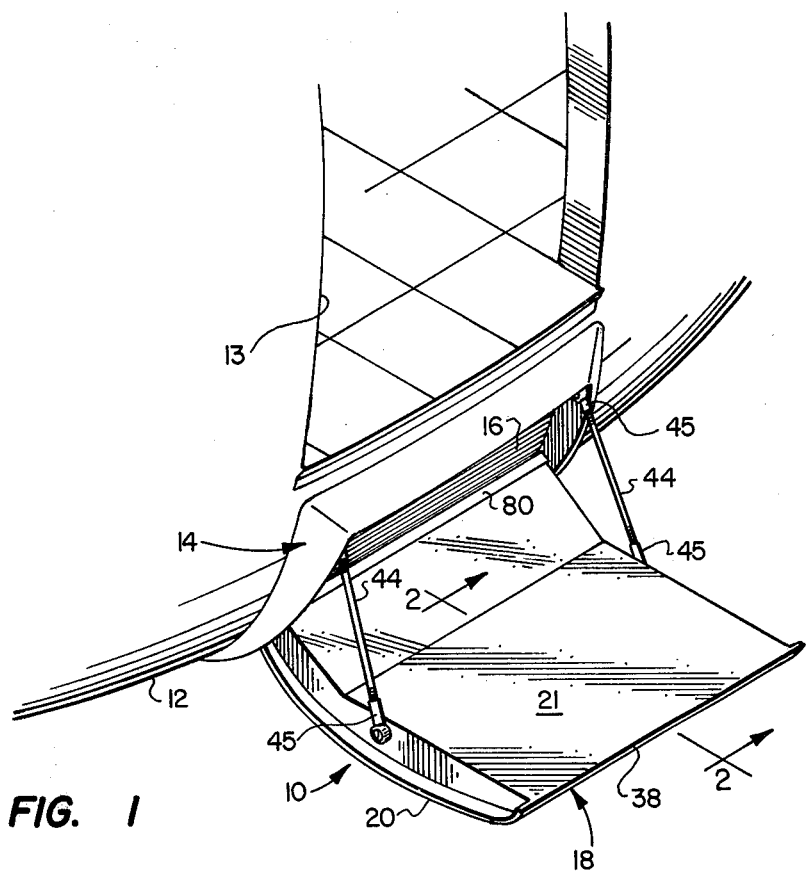
FIG. 1 is a perspective view of a portion of an aircraft fuselage including the step module of the present invention mounted thereon.

In the description which follows and in the drawings, like parts are indicated with the same reference numerals throughout, respectively. The drawings are not necessarily to scale and certain portions have been exaggerated in scale in order to more clearly illustrate certain features of the instant invention.

Referring to FIGS. 1 and 2, in particular, the step module of the present invention is illustrated and generally designated by the numeral 10. The step module 10 is adapted to be mounted on the exterior of an aircraft fuselage 12 which may take various forms and, in particular, in accordance with the present invention, the step module 10 is adapted to mount on the fuselage of a helicopter. The fuselage 12 includes a doorway 13 below which the step module 10 is fastened in a manner to be described in further detail herein. The step module 10 includes a streamlined body member or fairing generally designated by the numeral 14 and including a recess 16 for receiving a retractable step member generally designated by the numeral 18. The step member 18 includes an exterior surface portion 20 having a contour conforming to the cross-sectional contour of the body member 14, as illustrated in FIG. 2, so that in the retracted position of the step a uniform streamlined fairing is formed on the exterior of the fuselage 12, which fairing presents minimal aerodynamic resistance or drag. The exterior wall or surface 20 extends laterally on opposite sides of a main tread portion 21 of the step member 18 to provide space for pivot linkage interconnecting the step member with the body 14, which pivot linkage will be described further hereinbelow.

Referring particularly to FIGS. 2 and 6, the body member 14 is characterized by a substantially hollow reinforced plastic structure including a bottom wall 22 having a cross-sectional contour conforming to the contour of the skin of the fuselage 12. The body member 14 also includes an exterior wall portion 24 of streamlined contour. As illustrated somewhat in FIG. 6 and also FIG. 7, the body member 14 also includes a pair of longitudinal spaced apart bulkheads 26 which are integrally formed with the bottom and exterior walls 22 and 24, respectively.

As shown in FIGS. 2 and 6, adjacent each of the bulkheads 26 are disposed spaced apart mounting blocks 28 and 30 which are preferably formed of metal such as structural aluminum or the like and which are adapted to receive elongated threaded bolts 32 which extend through the skin of the fuselage 12 and are secured thereto by suitable means including nuts and/or reinforcing plate members, if needed. The bolts 32 are accessible through respective openings in the exterior wall 24, indicated in FIGS. 2 and 6 by the numeral 34. The support blocks 28 and 30 are suitably fixed to the body member 14 by being embedded in the reinforced plastic forming the bulkheads 26 and/or being secured to the bottom wall 22 by epoxy adhesive or the like. As indicated in FIG. 6, there are provided two blocks 28, as well as two blocks 30, which are spaced apart on opposite lateral sides of the step member 18. The support blocks 28 and 30 also form supporting members for linkage interconnecting the step member 18 and the body member 14. The body member 14 further includes a ledge 36 formed within the recess 16 and against which the nosing 38 of the step member 18 rests when the step member is moved to the retracted position.

Referring now particularly to FIG. 2, the step member 18 is characterized by a structural foam core 40 which may be formed of PVC structural foam plastic, for example, around which a reinforced plastic surface or skin 42 is constructed to form a lightweight but substantially rigid step member. The step member 18 is connected to the body member 14 by a first set of spaced apart linkages 44, one shown in FIG. 2, which are pivotally connected at one end to the support blocks 28 and pivotally connected at their opposite ends to the step member 18. The step member 18 is preferably provided with a suitable reinforcing portion, not shown, for receiving a pivot pin such as a machine screw or the like, generally designated by the numeral 48 in FIG. 7. The linkages 44 may be provided at their opposite ends with self-aligning bearing type rod end fittings 45 of a type commercially available and which are pivotally secured, respectively, to the step member 18 and the support blocks 28 by the screws 48. The linkages 44 may include a threaded rod portion 46 interconnecting the end fittings 45 for adjustment of the length of the linkages.

The step member 18 is also connected to the body member 14 by rearwardly disposed links 50 interconnecting the rear end portion of the step member with the support blocks 30. The linkages 50, as shown in FIG. 7 by way of example, include hub portions 52 which are suitably fixed to a pivot shaft 54 which extends through the recess 16 and is rotatably supported at opposite ends in the support blocks 30. The pivot shaft 54 is suitably drivably connected to a motor and gear reduction unit 56 for rotating the shaft 54 to extend and retract the step member 18 with respect to the body member 14.

The opposite ends of the linkages 50 are each connected to opposed ends of an elongated deflectable beam 58 illustrated in FIGS. 5, 6 and 7. As shown by way of example in FIG. 7, the distal ends 59 of the beam 58 are threaded to provide for a retaining nut 60 to be engaged therewith for retaining the respective links 50 connected to the beam ends. The beam 58 comprises an elongated steel shaft which is suitably supported in a structural aluminum channel member 62, FIG. 5, and retained therein by spaced apart dowel pins 63. Somewhat U-shaped wear sleeves 64 are provided in the channel member adjacent the opposite distal ends 59 of the shaft 58. The beam 58 and its supporting member 62 are disposed in a slot formed within the interior of the structural foam core of the step member 18 and suitably retained therein. The sidewalls of the step member 18 are provided with elongated slots 66 to accommodate deflection of the beam ends 59.

Figure 3:
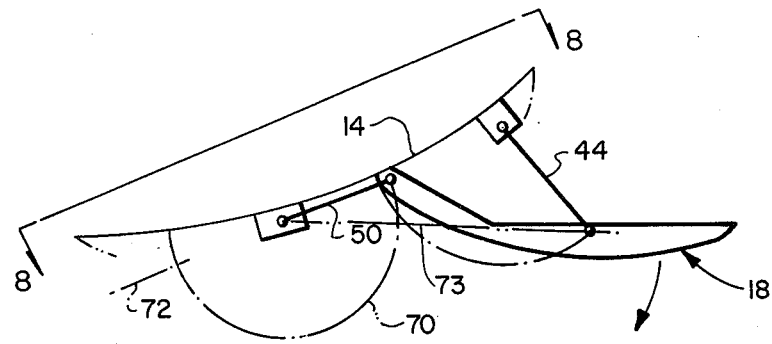
FIGS. 3 and 4 are schematic views illustrating the motion of the linkage for extending and retracting the step member.
Figure 4:
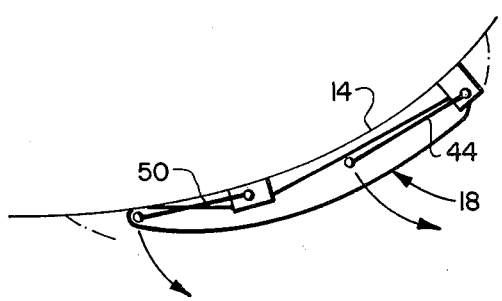

A particular advantage of the present invention resides in the provision of the deflectable beam 58 forming pivot connections between the linkages 50 and the step member 18. Referring now to FIGS. 3 and 4, the step member 18 is shown in the deployed or extended position and the retracted position, respectively. The step member 18 together with the linkages 44, 50 and the body member 14 form a four bar linkage in which the body member is the fixed link. The linkages 44 and 50 and the link formed by the step member 18 are proportioned such that as the step member is moved from the deployed position shown in FIG. 3, by rotation of the shaft 54, the pivot connection formed by the linkages 50 and the beam 58 follows an arcuate path designated by the numeral 70. As the pivot connection between the linkages 50 and the step member 18 approaches the point of intersection of the line 72, FIG. 3, with the arc 70 the length of the linkages 50 becomes, in effect, too long or the distance between the pivotal connections of the links 44 and 50 with the step member 18 become too short to permit unrestricted travel of the pivotal connection between the linkages 50 and the step member in a clockwise direction, viewing FIG. 3, toward or past the intersection of the lines 72 with the arc 70. Without the provision of the deflectable beam ends 59, the step member 18 would not fully retract into the position illustrated in FIG. 4.

Figure 8:
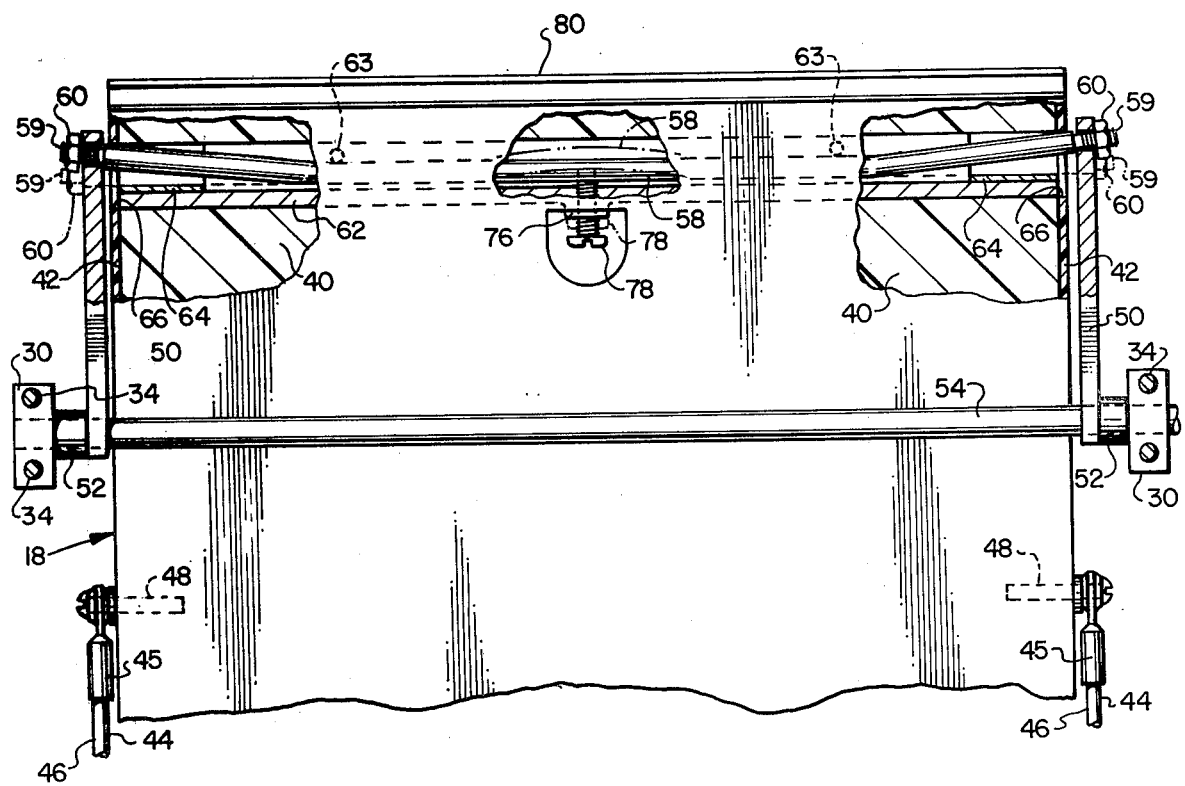
FIG. 8 is a partial plan view taken from the line 8—8 of FIG. 3 showing the deflectable beam in the maximum deflected position and in a nondeflected position, respectively.

However, as the step member 18 is retracted by rotation of the shaft 54, and upon approaching the intersection of the lines 70 and 72, a biasing force tending to resist movement of the step member increases as the beam ends 59 of the pivot beam 58 deflect to accommodate the mismatch in the lengths of the linkages. Upon reaching the point of intersection of the lines 70 and 72, the linkage 50 is at a dead center or over center position wherein the pivotal connections between the linkage 50 with the step member 18 and the body member 14 lie on a line which also intersects the pivotal connection between the linkage 44 and the body member 14. The partial plan view of FIG. 8 illustrates the step member 18 in the position of maximum deflection of the ends of the pivot beam 58 as indicated by the solid lines depicting the beam and the beam ends 59, which position corresponds to that just described wherein the pivotal connections between the links 50 with the step member 18 and the body member 14 are aligned and lie on a line which also intersects the pivotal connection between the linkage 44 and body member 14. The plan view of FIG. 8 is taken in a plane parallel to the aforementioned line intersecting the respective pivot connections. FIG. 8 also illustrates the normal or relaxed position of the opposed ends 59 of the beam 58 as indicated by the dashed lines. When the links 50 are swung from the position shown in FIG. 3 toward the position shown in FIG. 4 the beam ends 59 are in their positions indicated by the dashed lines in FIG. 8 until the pivotal connection between the links 50 and the step member 18 approach the point of intersection of the line 72 with the arc 70 whereupon deflection occurs progressively until the maximum deflection of the beam ends 59 is obtained as indicated in FIG. 8. Continued rotation of the shaft 54 in a clockwise direction, viewing FIG. 3, is accomplished with a biasing force due to the deflection of the beam ends 59 tending to rotate the shaft in that direction to bias the step member 18 into the retracted position shown in FIG. 4.

As the step member 18 fully retracts into the recess 16 and the nosing 38 becomes engaged with the ledge 36, a partial deflection of the beam ends 59 remains to bias the step snugly into the retracted position. Accordingly, due to the linkage arrangement provided by the links 50, the beam 58 and the particular spacing between the pivotal connections of the links 44 and 50 with the step member 18, a unique combination is provided which tends to maintain the step in a retracted position. Of course, when the step member 18 is actuated to move from the position of FIG. 4 to the position of FIG. 3, the beam 58 acts to bias the step toward the deployed position as the pivot connections formed by the links 50 and the beam ends 59 passes the intersection of the line 72 and arc 70.

The biasing force exerted by the beam 58 on the step member 18 may be adjusted in accordance with a further aspect of the present invention. Referring to FIG. 5, in particular, the support member 62 is provided with a centrally disposed boss 76, which may be formed by a separate metal insert, not shown, or as part of the member 62 itself. The boss 76 is internally threaded to provide for receiving an adjusting screw 78 threadedly engageable therein, which screw may bear against the central portion of the beam 58 to deflect the beam in a direction which will tend to deflect the beam ends 59 in a direction opposite to that which the links 50 tend to deflect the beam ends 59. This deflection of the central portion of the beam 58 is indicated in FIG. 8 by the dashed lines showing the beam central portion displaced by the screw 78. Accordingly, by preadjusting the degree of deflection of the central portion of the beam 58 by the screw 78, the biasing force exerted on the links 50 may be suitably varied. The step member may be provided with an access hole, not shown, for adjustment of the screw 78 after installation of the beam 58 within the core 40.

The arrangement of the step member 18 together with the supporting links 44 and 50 also provides for a rear lateral end surface 19 to serve as a load bearing surface for supporting loads on the step 18 in its extended position. As illustrated in FIG. 2, in the extended position the surface 19 is rotated into engagement with the bottom wall 22 whereby a load on the tread 21 of the step will tend to rotate the step clockwise about the connection of the linkage 44 with the step member whereby the surface 19 reacts to such forces to support the step with a distribution of the load force. The load bearing surface 19 is suitably protected by a sheet metal cap 80 which may be suitably fixed over the surface 19 and adhesively bonded to the step member, for example. The particular linkage arrangement described and shown also provides for the step member to be biased in the extended, load bearing position under all loads which would normally be applied to the step tread. The pivot connection between the links 50 and the step member also goes over center at the intersection of a line 73 with arc 70, as shown in FIG. 3. Line 73 represents a line passing through the pivot axes of the link 50 with the body member 14 and the step member and also passing through the pivot connection between link 44 and the step member when the step member 18 is in the extended position shown. Accordingly, with the step member in the fully deployed position shown, the linkage is stable with loads applied generally downward on the tread 21.

Referring again to FIG. 7, and as previously described herein, the step member 18 is rotated between the positions illustrated in FIGS. 3 and 4 by the electric gear reduction drive and motor unit 56 which is suitably drivably connected to the shaft 54. The drive motor 56 may be controlled from the aircraft cabin to operate the step 18 to be deployed into the extended position and, of course, retracted to the position shown in FIG. 4 prior to take off. The motor 56 may also be replaced by a suitable pneumatic or hydraulic motor. Moreover, the step may be manually moved between the retracted and extended positions. The step member 18 is adapted to be locked in the extended and retracted positions by a solenoid actuated lock pin 84 mounted on the body member 14. As shown in FIG. 7, the lock pin 84 is in the retracted position but upon actuation of a solenoid 86, which may also be controlled from the aircraft cabin, the pin 84 may extend into a recess 88 formed in the side of the step member 18 to lock the step member in the retracted position. A suitably aligned recess, not shown, is also provided on the step member 18 to allow the solenoid actuated pin 84 to be extended thereinto when the step member is in the extended position shown in FIG. 2. Although the lock pin 84 is shown retracted in FIG. 7, it is preferably adapted to be spring biased into the extended and locking position when the solenoid is deenergized.

Although certain features of the present invention pertain to the modular arrangement of the step and body members as an externally added unit, the linkage arrangement disclosed herein could also be used on steps built into the aircraft as an integral part thereof. Those skilled in the art of aircraft steps will appreciate that various substitutions and modifications of the invention disclosed herein may be made without departing from the scope and spirit of the appended claims.

What is claimed is:

1. A retractable aircraft step for attachment to an airframe, said step comprising:
   a support member;
   a step member connected to said support member and movable between a retracted position and an extended position wherein said step member extends generally under and adjacent to a doorway in said airframe;
   linkage means interconnecting said step member and said support member for moving said step member between said positions, said linkage means including first link means pivotally connected to said support member and said step member, second link means pivotally connected to said support member at a point spaced from said pivotal connection of said first link means to said support member, said second link means being pivotally connected to said step member at a point spaced from the pivotal connection of said first link means to said step member, and a beam mounted on said step member and including opposed end portions forming pivotal connections between respective ones of a pair of links comprising one of said first and second link means and said step member, said end portions being elastically deflectable at an interference point in the path of movement of said linkage means to allow said step member to be moved between said extended and retracted positions.

2. A retractable aircraft step for attachment to an airframe, said step comprising:
   a support member;
   a step member connected to said support member and movable from a retracted position to an extended position wherein said step member is engaged with said support member and positions a tread surface on said step member generally under and adjacent to a doorway in said airframe;
   linkage means interconnecting said step member and said support member for moving said step member between said positions, said linkage means including first link means pivotally connected to said support member and said step member, second link means pivotally connected to said support member at a point spaced from said pivotal connection of said first link means to said support member, said second link means being pivotally connected to said step member at a point spaced from the pivotal connection of said first link means to said step member;
   said pivotal connection between said first link means and said step member is displaced in the direction of movement to extend said step member from its retracted position from the point at which said pivotal connection between said first link means and said step member is over center and on a line extending between the pivot axis of said first link means and said support member and the pivot axis of said second link means and said step member when said step member is in the extended position so that a load placed on said tread surface biases said step member into a stable load bearing position in engagement with said support member.

3. A retractable step assembly for attachment to an airframe, said step assembly comprising:
   a support member;
   a step member connected to said support member and movable between a retracted position and an extended position wherein said step member extends generally under and adjacent to a doorway in said airframe;
   linkage means interconnecting said step member and said support member for moving said step member between said positions, said linkage means including first link means pivotally connected to said support member and said step member, second link means pivotally connected to said support member at a point spaced from said pivotal connection of said first link means to said support member, said second link means being pivotally connected to said step member at a point spaced from the pivotal connection of said first link means to said step member, and means on said step member including a pair of opposed beam ends forming pivotal connections between respective ones of a pair of links comprising one of said first and second link means and said step member, said beam ends being elastically deflectable during movement of said linkage means to move said step member from said extended position to said retracted position to exert a force on said linkage means which biases said step member in said retracted position.

4. A retractable step assembly for attachment to a support member secured to a transport vehicle, said step assembly comprising:
   a step member adapted to be connected to said support member and movable between a retracted position and an extended position wherein said step member extends generally under and adjacent to a doorway in said vehicle;
   linkage means interconnecting said step member and said support member for moving said step member between said positions, said linkage means including first link means pivotally connected to said support member and said step member, second link means pivotally connected to said support member at a point spaced from said pivotal connection of said first link means to said support member, said second link means being pivotally connected to said step member at a point spaced from the pivotal connection of said first link means to said step member, and means including a pair of opposed beam ends forming pivotal connections between respective ones of a pair of links comprising one of said first and second link means and said step member, said beam ends being elastically deflectable during movement of said linkage means to allow said step member to be moved between said extended and retracted positions.

5. An aircraft step module for attachment to the exterior of an aircraft fuselage, said step module comprising:
a body member including a recess formed therein and a mounting surface engageable with said fuselage;
a step member connected to said body member and movable between a retracted position wherein said step member is substantially disposed in said recess and an extended position wherein said step member extends generally under and adjacent to a doorway in said fuselage;
linkage means interconnecting said step member and said body member for moving said step member between said positions, said linkage means including a first pair of links pivotally connected at one end, respectively, to said body member and at their opposite ends, respectively, to opposite lateral sides of said step member at a point intermediate the ends of said step member, a second pair of links pivotally connected at one end, respectively, to said body member at a point spaced from said pivotal connection of said first pair of links to said body member, and at their opposite ends, respectively, to said step member at a point spaced from said pivotal connection of said first pair of links to said step member and adjacent one end of said step member opposite a nosing of said step member; and
a beam mounted on said step member and including opposed end portions forming the pivotal connections between respective ones of said second pair of links and said step member, said end portions being elastically deflectable at an interference point on the path of rotation of the pivotal connections between said second pair of links and said step member whereby said interference point may be passed to permit said step member to be retracted and extended and wherein said step member is biased in the retracted position.

6. The step module set forth in claim 5 including:
means for deflecting said beam in a direction which will tend to deflect said end portions in a direction opposite to the deflection of said end portions at said interference point to vary the deflection force exerted by said end portions on said second pair of links.

7. The step module set forth in claim 6 wherein:
said beam includes a support member and an adjusting screw mounted on said support member and operable to selectively deflect said beam at a point substantially midway between said end portions.

8. The step module set forth in claim 5 wherein:
said beam is under deflection at said end portions when said step is in the fully retracted position.

9. A step module for attachment to a transport vehicle, said step module comprising:
a support member for supporting said step module on said vehicle;
a step member connected to said support member and movable between a retracted position and an extended position wherein said step member extends generally under and adjacent to a doorway of said vehicle;
linkage means interconnecting said step member and said support member for moving said step member between said positions; said linkage means including first link means pivotally connected to said support member and said step member and second link means pivotally connected to said support member and at said step member at respective points spaced from said pivotal connections of said first link means to said support member and said step member, respectively, said support member, said first and second link means and said step member forming a four bar linkage, one of said first and second link means and said step member being of incorrect length to permit unrestricted rotation of said one link means with respect to said support member between said retracted and extended positions of said step member; and
a pivot member forming at least part of the pivotal connection between one of said link means and one of said step member and said support member, said pivot member being elastically deflectable to permit rotation of said one link means with respect to said support member between said retracted and extended positions of said step member and to bias said step member toward said retracted position.

10. The step module set forth in claim 9 wherein:
said support member includes a body having a streamlined contour, said body being adapted for mounting on the exterior of said vehicle, said body including a recess for receiving said step member in said retracted position of said step member, and said step member includes a surface forming a portion of said streamlined contour of said body and covering said recess in the retracted position of said step member.

11. The step module set forth in claim 9 wherein:
said pivot member forms at least part of a pivot connection between said one link means and said step member and said pivot member is elastically deflected at an interference point in the path of rotation of of said pivot connection between said one link means and said step member so that said step member may be moved between said extended and retracted positions.

12. The step module set forth in claim 11 wherein:
said pivot member includes a beam supported on said step member and having opposed elastically deflectable end portions forming a pivotal connection between said one link means and said step member.

13. The step module set forth in claim 11 wherein:
said first link means includes a pair of links connected at one end, respectively, to said support member and at their opposite ends, respectively, to opposite lateral sides of said step member at a point intermediate the ends of said step member.

14. The step module set forth in claim 13 wherein:
said second link means comprises a pair of links connected at one end, respectively, to said support member and at their opposite ends, respectively, to said step member adjacent one end of said step member opposite a nosing of said step member.

15. The step module set forth in claim 9 wherein:
a longitudinal edge of said step member opposite a nosing of said step member together with one of said link means supports said step member in the extended position.

16. The step module set forth in claim 9 together with:
a shaft rotatably mounted on said support member and connected to one of said link means, and a motor drivably connected to said shaft for rotating said shaft and said one link means to move said step member between said positions.

17. The step module set forth in claim 16 wherein:
said shaft comprises the pivotal connection between said second link means and said support member.

18. The step module set forth in claim 9 together with:
power operated lock pin means mounted on said support member and operable to lock said step member in the retracted position.

* * * * *